(12) United States Patent
Hara et al.

(10) Patent No.: US 6,969,552 B2
(45) Date of Patent: Nov. 29, 2005

(54) RESIN COMPOSITION CONTAINING A REDUCING AGENT TO BE USED IN A MULTI-LAYER LAMINATE FOR STORING LIQUID FOODS

(75) Inventors: Morio Hara, Kanagawa (JP); Norio Kobayashi, Tokyo (JP); Jun Tanaka, Kanagawa (JP); Tadakatsu Ikenoya, Tokyo (JP); Hiroaki Ogita, Tokyo (JP)

(73) Assignee: Tetra Laval Holdings & Finance, S.A., Pully (CH)

( * ) Notice: Subject to any disclaimer, the term of this patent is extended or adjusted under 35 U.S.C. 154(b) by 0 days.

(21) Appl. No.: 08/973,416

(22) PCT Filed: May 17, 1996

(86) PCT No.: PCT/JP96/01304

§ 371 (c)(1),
(2), (4) Date: Nov. 14, 1997

(87) PCT Pub. No.: WO96/36667

PCT Pub. Date: Nov. 21, 1996

(65) Prior Publication Data

US 2003/0129433 A1 Jul. 10, 2003

(30) Foreign Application Priority Data

May 17, 1995 (JP) .......................................... P7-118426
May 17, 1995 (JP) .......................................... P7-118430

(51) Int. Cl.$^7$ ............................ B32B 19/00; B32B 5/16; C08K 5/05
(52) U.S. Cl. ........................ 428/357; 428/403; 428/407; 524/386; 524/557; 524/570
(58) Field of Search .................... 428/475.8, 476.1, 428/476.3, 476.9, 520, 35.4, 36.6, 36.7, 516, 403, 407, 357; 524/386, 387, 612, 503, 388, 557

(56) References Cited

U.S. PATENT DOCUMENTS

| | | | | |
|---|---|---|---|---|
| 3,857,754 A | * | 12/1974 | Hirata et al. ................ | 161/227 |
| 4,826,955 A | * | 5/1989 | Akkapeddi et al. .......... | 528/324 |
| 4,927,689 A | * | 5/1990 | Markiewicz ................ | 428/34.8 |
| 4,971,864 A | * | 11/1990 | McCord ..................... | 428/516 |
| 4,999,229 A | * | 3/1991 | Moritani et al. ............ | 428/36.6 |
| 5,133,999 A | * | 7/1992 | Lofgren et al. ............. | 428/34.2 |
| 5,204,389 A | * | 4/1993 | Hofeldt et al. .............. | 524/72 |
| 5,274,024 A | * | 12/1993 | Koyama et al. ............. | 524/440 |
| 5,320,889 A | * | 6/1994 | Bettle, III .................. | 428/36.6 |
| 5,492,953 A | * | 2/1996 | Itamura et al. ............. | 524/239 |
| 5,534,351 A | * | 7/1996 | Pearson et al. ............. | 428/516 |
| 5,591,495 A | * | 1/1997 | Torre et al. ................ | 428/35.7 |
| 5,663,223 A | * | 9/1997 | Teumac et al. ............. | 524/109 |
| 5,820,956 A | * | 10/1998 | Hatakeyama et al. ...... | 428/36.6 |
| 5,834,079 A | * | 11/1998 | Blinka et al. .............. | 428/349 |
| 5,955,527 A | * | 9/1999 | Cochran et al. ............ | 524/413 |
| 6,130,263 A | * | 10/2000 | Hekal ........................ | 206/204 |

FOREIGN PATENT DOCUMENTS

| | | | |
|---|---|---|---|
| EP | 0 301 719 A1 | | 2/1989 |
| EP | 0 328 337 A1 | | 8/1989 |
| JP | 50115285 A | * | 9/1975 |
| JP | 56096686 A | * | 8/1981 |
| JP | 59-124941 A | | 7/1984 |
| JP | 01-207339 A | | 8/1989 |
| JP | 02-255752 A | * | 10/1990 |
| JP | 03-197566 A | | 8/1991 |
| WO | 89/12119 A1 | | 12/1989 |
| WO | 94/09084 A1 | | 4/1994 |

OTHER PUBLICATIONS

Abstract JP 02 255752 A, Oct. 16, 1990, Database WPI Section Ch, Week 9047, Derwent Publications Ltd., London, GB; Class A14, AN 90–352879 XP002109874.

* cited by examiner

Primary Examiner—Kevin R. Kruer
(74) Attorney, Agent, or Firm—Buchanan Ingersoll PC

(57) ABSTRACT

A pellet to be used in a multi-layer laminate for storing liquid foods, comprising a hydrophilic reducing organic compound and a hydrophilic and water insoluble thermoplastic resin, wherein the hydrophilic reducing organic compound is kneaded with the hydrophilic and water insoluble thermoplastic resin. The kneaded compound comprised of the hydrophilic reducing organic compound and the hydrophilic and water insoluble thermoplastic resin is then kneaded with a hydrophobic thermoplastic resin and formed into a pellet. The pellet is such that 50 grams of the pellet when stored at 15° C. for one week in a sealed 180 ml container requires the presence of water in order to absorb oxygen.

8 Claims, No Drawings

RESIN COMPOSITION CONTAINING A REDUCING AGENT TO BE USED IN A MULTI-LAYER LAMINATE FOR STORING LIQUID FOODS

This application is a continuation of U.S. application Ser. No. 08/973,416, filed on Nov. 14, 1997, which was a national stage filing under 35 U.S.C. §371 of International Application No. PCT/JP96/01304 filed on May 17, 1996.

TECHNICAL FIELD

The present invention relates to a resin composition and a laminate for storage of aqueous liquid food such as juice, milk, liquor and the like.

BACKGROUND ART

Resin containers and paper containers for tightly sealed packaging of liquid food have a wide range of applications because of their adequate strength and lightness.

However, because resin containers and paper containers have a higher oxygen permeability than metal cans, the flavor of the contents of such containers undergoes degradation, thereby creating a short quality preservation period and other related problems.

Thus, in order to extend quality preservation period, an oxygen barrier resin such as ethylene-vinyl alcohol copolymer or the like is provided in the case of resin containers, and in the case of paper containers, containers are developed in which a paper base material is laminated by an aluminum foil, an oxygen barrier resin such as ethylene-vinyl alcohol copolymer, polyvinylden chloride resin or the like, or a resin film on which an inorganic oxide such as silica is deposited. Such containers are used for storage of liquid food.

Further, oxygen absorbing containers have been proposed in which an oxidation catalyst such as cobalt stearate or the like, iron powder and a reducing organic compound are included in the resin layer and bonding layer that make up the laminate.

However, in the container laminated by oxygen barrier resin, the blockage of oxygen is not complete, and in the container laminated by aluminum foil and resin film on which inorganic oxide is deposited, microscopic cracks (pin-holes) can occur during the lamination and molding process, thereby easily degrading the oxygen gas barrier property.

Further, in the case where iron powder is included, a significant increase in weight is required in order to obtain adequate results, and this makes it impossible to achieve a light-weight container. Moreover, there also exists sanitary problems. Sanitation problems as well as control over catalyst function also exist when an oxidation catalyst is used.

Moreover, difficulty arises in the case where a reducing organic compound is used because it is necessary to use a safe compound and care must be taken with regards to the heat resistance of the organic compound and the elution from the resin layer.

It is an object of the present invention to provide a resin composition and a laminate which contain a reducing organic compound and which make it possible to safely package and storage liquid food for a long period.

DISCLOSURE OF THE INVENTION

Through intensive research, the present inventors were able to complete the present invention by finding that the following resin composition and laminate achieve the object of the present invention. The foregoing resin composition is obtained by melt kneading a hydrophilic reducing organic compound with a hydrophilic and water insoluble thermoplastic resin and then dispersing the resulting material in a hydrophobic thermoplastic resin. A porous inorganic compound containing ascorbic acids in a hydrophobic resin such as polyolefin resin or the like may also be added during the kneading step. The laminate is constructed so that the innermost layer is made of the foregoing composition, or that the innermost layer is made of a specific resin with the layer adjacent thereto being made of the foregoing composition, or that the innermost layer or the layer adjacent to the innermost layer is made of a resin such as polyolefin resin or the like including a porous inorganic compound containing ascorbic acids.

Namely, the gist of the present invention is (1) a resin composition for storing liquid foods, in which a kneaded mixture of a hydrophilic reducing organic compound and a hydrophilic and water insoluble thermoplastic resin is dispersed in a hydrophobic thermoplastic resin; (2) a resin composition for storing liquid foods, in which a kneaded mixture of a hydrophilic reducing organic compound, a porous inorganic compound and a hydrophilic and water insoluble thermoplastic resin is dispersed in a hydrophobic thermoplastic resin; (3) a laminate for packaging liquid foods, having an innermost layer made from the composition described in (1) or (2) above; (4) a laminate having an innermost layer made of a hydrophilic and water insoluble thermoplastic resin and a layer adjacent to the innermost layer made from the composition described in (1) or (2) above; (5) a laminate having an innermost layer made of resin that has a water vapor transmission rate of not less than 5 g/m$^2$·24 hours at 40° C. and 90% RH with a layer adjacent to the innermost layer made from the composition described in (1) or (2) above; (6) a laminate having an innermost layer made of a resin layer in which a porous inorganic compound supporting ascorbic acids dispersed in a hydrophobic thermoplastic resin; and (7) a laminate having an innermost layer made of resin layer that has a water vapor transmission rate of not less than 5 g/m$^2$·24 hours at 40° C. and 90% RH and a layer adjacent to the innermost layer made of a resin in which a porous inorganic compound supporting ascorbic acids is dispersed in a hydrophobic thermoplastic resin.

In this connection, in the laminate of the present invention, the innermost layer refers to the layer that is closest to the liquid foods, namely the layer that is in direct contact with the liquid foods, when the laminate is used to package liquid foods.

BEST MODE FOR CARRYING OUT THE INVENTION

The hydrophilic reducing organic compound in accordance with the present invention may include an ascorbic acids, a polyphenols, a catechins or the like, and the ascorbic acids may include ascorbic acid, araboascorbic acid or the salts (sodium salt, potassium salt, etc.) thereof and the like.

The polyphenols includes pyrogallol, catechol, gallic acid, resorcin, hydroquinone, and it is possible to use any mixture thereof.

The catechins includes epicatechin, epigallocatechin, epicatechin gallate, epigallocatechin gallate, and it is possible to use any mixture thereof.

Among these reducing organic compounds, the ascorbic acids and the catechins are preferred, with ascorbic acid being particularly preferred.

With regards to a hydrophilic and water insoluble thermoplastic resin, it is possible to use ethylene-vinyl alcohol copolymer, polyvinyl alcohol having a saponification degree of 95% or higher, polyamide resin (nylon 6, nylon 6.6, nylon 6.12, nylon 11, nylon 12, etc.), polyester resin, acetyl cellulose and the like. Among these, ethylene-vinyl alcohol copolymer is particularly preferred.

As for a hydrophobic thermoplastic resin, it is possible to use polyolefin resin, polystyrene resin, polyvinyl chloride resin, methacryl resin, ethylene-α-unsaturated carboxylic acid copolymer, ionomer, unsaturated carboxylic acid modified polyolefin, cyclo-olefin copolymer and the like.

The polyolefin resin includes polyethylene based resin (low-density polyethylene, medium-density polyethylene, high-density polyethylene, linear low-density polyethylene, etc.), polypropylene based resin (homopolypropylene, ethylene-propylene random copolymer, ethylene-propylene block copolymer, etc.), polybutene-1, polyhexene-1, polymethylpentene-1 and the like.

The ethylene-α-unsaturated carboxylic acid copolymer includes a copolymer comprised of ethylene and an α-unsaturated carboxylic acid such as acrylic acid, methacrylic acid or the like.

The unsaturated carboxylic acid modified polyolefin used in the present invention can be obtained by grafting an unsaturated carboxylic acid or derivative thereof to the polyolefin resin described above.

The unsaturated carboxylic acid includes α-unsaturated carboxylic acid, α,β-unsaturated dicarboxylic acid, alicyclic unsaturated dicarboxylic acid containing a cis-double bond in a ring and the like. Further, the α-unsaturated carboxylic acid includes acrylic acid, methacrylic acid, crotonic acid and the like. The α,β-unsaturated dicarboxylic acid or the derivative thereof includes maleic acid, maleic acid anhydride and the like. The alicyclic unsaturated dicarboxylic acid containing a cis-double bond in a ring or the derivative thereof includes HIMIC ACID, HIMIC ACID ANHYDRIDE, tetrahydrophthalic acid, tetrahydrophthalic acid anhydride, CHLORENDIC ACID and the like.

The cyclic olefin copolymer is a copolymer of cyclic olefin, and ethylene or α-olefin.

Further, the cyclic olefin includes cyclopentene, cyclohexene, cycloheptene, cyclooctene, 2-norbornene and the like, and the α-olefin includes propylene, 1-butene, 1-hexene, 4-methyl-1-pentene and the like.

Among the thermoplastic resins described above, polyolefin resins, and in particular polyethylene based resins and polypropylene based resins are preferred.

The porous inorganic compounds used in the present invention includes zeolite, silica gel, sepiolite, porous silica, porous silica-alumina and the like. Among these, zeolite is particularly preferred.

Further, while it is possible to use natural zeolite, synthetic zeolite is preferred in terms of uniformity and purity, with A type, X type and Y type zeolite being particularly preferred. The synthetic zeolite may be a hydrogen type or cation type (sodium type, potassium type, calcium type, etc.) zeolite.

In this connection, these porous inorganic compounds are preferably dried before being used.

The composition (1) of the present invention is manufactured by dispersing a kneaded compound comprised of the hydrophilic reducing organic compound (hereafter referred to as the A component") and the hydrophilic and water insoluble thermoplastic resin (hereafter referred to as the B component") in a hydrophobic thermoplastic resin (hereafter referred to as the C component"), in which after first kneading the A component and the B component, these components are then kneaded with the C component.

The kneading of the A component and the B component are preferably carried out at a temperature not higher than the melting point or decomposition point of the A component and not lower than the melting temperature of the B component by an appropriate kneading machine, and preferably by an extruder.

Although it is not possible to establish an absolute usage ratio of the A component and the B component because of its dependence on the type of A component and B component, the type of liquid foods, the storage period and the environmental conditions existing inside and outside the storage container, during the kneading of the A component and the B component, the A component should normally be present in the range of 0.1~50% by weight, and preferably in the range of 0.2~20% by weight.

Next, the kneaded compound comprised of the A component and the B component obtained as described above is kneaded with and dispersed in the C component to obtain the composition (1) of the present invention. The kneading of the kneaded component and the C component is preferably carried out at a temperature not lower than the melting temperature of the C component in the same manner as the kneading of the A component and B component.

For the same reason as was explained above for the case of kneading the A component and the B component, it is not possible to establish an absolute kneading ratio between the C component and the kneaded compound comprised of the A component and the B component, but in general in the composition (1) of the present invention the A component should normally be present in the range of 0.05~10% by weight and preferably in the range of 0.2~5% by weight, the B component should normally be present in the range of 3~40% by weight and preferably in the range of 5~30% by weight, and the C component should preferably be present in the range of 50~96% by weight and preferably in the range of 65~95% by weight.

When necessary, it is possible to use a compatibilizer such as maleic acid anhydride modified polyolefin or the like when kneading the C component and the kneaded compound comprised of the A component and the B component. Further, it is also possible to use a sufficiently small amount of well-known antioxidant which does not degrade the hygienic characteristics.

Next, the composition (2) of the present invention is manufactured by dispersing a kneaded compound comprised of the A component, a porous inorganic compound (hereafter referred to as the D component) and the B component in the C component, in which the A component and the D component either simultaneously or separately are kneaded with the B component or after the A component is kneaded with the D component, these components are kneaded with the B component, and then the resultant material is kneaded with the C component. In this connection, it is preferred that after the A component and the D component are mixed together, they be kneaded with the B component, and then the resulting material be kneaded with the C component.

The kneading of the A component, D component and the B component are preferably carried out at a temperature not higher than the melting point or decomposition point of the A component and not lower than the melting temperature of the B component by an appropriate kneading machine, and preferably by an extruder.

Although it is not possible to establish an absolute usage ratio of A component, D component and B component because it depends on the type of A component, D component and B component, the type of liquid foods, the storage period and the environmental conditions existing inside and outside the storage container, during the kneading of the A component, D component and the B component, the A component should normally be present in the range of 0.1~50% by weight, and preferably in the range of 0.2~20% by weight, and the D component should normally be present in the range of 0.1~30% by weight, and preferably in the range of 0.1~20% by weight. Further, the ratio of the A component and the D component, D/A (weight ratio), should preferably lie within the range of 0.1~5.

Next, the kneaded compound comprised of the A component, D component and the B component obtained as described above is kneaded with the C component so that the A component, D component and the B component are dispersed in the C component and the composition (2) of the present invention is obtained. The kneading of the kneaded component and the C component is preferably carried out at a temperature not lower than the melting temperature of the C component in the same manner as the kneading of the A component, D component and B component.

For the same reason as was explained above for the case of kneading the A component, D component and the B component, it is not possible to establish an absolute kneading ratio between the C component and the kneaded compound comprised of the A component, D component and the B component, but in general in the composition (2) of the present invention the A component should normally be present in the range of 0.05~10% by weight and preferably in the range of 0.2~5% by weight, the D component should normally be present in the range of 0.05~10% by weight, and preferably in the range of 0.1~5% by weight, the B component should normally be present in the range of 3~40% by weight and preferably in the range of 5~30% by weight, and the C component should preferably be present in the range of 40~96% by weight and preferably in the range of 60~95% by weight.

When necessary, it is possible to use a compatibilizer such as maleic acid anhydride modified polyolefin or the like when kneading the C component and the kneaded compound comprised of the A component, D component and the B component. Further, it is also possible to use a sufficiently small amount of well-known antioxidant which does not degrade hygienic characteristics.

The composition (1) and composition (2) of the present invention obtained as described above can be used as a packaging material for storing liquid foods; or they can be used while mixing with a raw material for making such a packing material.

Further, the composition (1) and the composition (2) (which may be hereinbelow referred to as the compositions) can be molded into an appropriately shaped molded body which can be used as a liquid foods container; or the shaped body is molded from the composition, wrapped by another appropriate composition, and filled.

The present invention includes a laminate for packaging liquid food, in which the innermost layer is made from the foregoing compositions, a laminate in which the innermost layer is made from the hydrophilic and water insoluble thermoplastic resin with an adjacent layer made from the foregoing compositions, and a laminate in which the innermost layer is made of resin film that has a water vapor transmission rate of not less than 5 g/m$^2$·24 hours at 40° C.

and 90% RH (relative humidity) and an adjacent layer made from the foregoing compositions. There are no limitations to the thickness of such laminate, but the thickness may lie within the range 10~600 μm, which is a normal thickness of a packaging material for storing liquid foods. Of course, it is possible to make the laminate thinner or thicker than this range.

As for the hydrophilic and water insoluble thermoplastic resin used for the innermost layer, it is possible to select any of the compounds from the B component which makes up one component of the foregoing compositions, but ethylene-vinyl alcohol copolymer, and polyvinyl alcohol having a saponification degree of 95% or higher are preferred, with ethylene-vinyl alcohol copolymer being particularly preferred.

Further, with regards to the resin of the resin layer having the above-described water vapor transmission rate and used for forming the innermost layer, it is possible to use polyolefin resin, polyamide resin, polyester resin, ethylene-vinyl acetate copolymer, ethylene-α-unsaturated carboxylic acid copolymer, ionomer and the like or a combination thereof. From these, polyolefin resin, polyamide resin and ethylene-α-unsaturated carboxylic acid copolymer may be freely selected. Of these, polyolefin resin is preferred, with polyethylene based resin and polypropylene based resin being particularly preferred. Further, even though the thickness of the resin layer which satisfies the above-described water vapor transmission rate depends on such factors as the type of resin and the processing method thereof, it is normally 80 μm or less, and in the case of polyethylene based resin and polypropylene based resin, it is normally 30 μm or less.

As for the base material layer of the laminate, it is possible to use any base material normally used in packaging of liquid foods, such as films and sheets made of various synthetic resins, paper, metal foil and the like or a laminate comprised of such materials.

Further, there is no limitation to the method of laminating the base material layer and the layer comprised of the foregoing composition (which may be hereafter referred to as the resin layer), it is possible to use standard lamination methods.

For example, it is possible to use a extrusion lamination method in which the resin layer undergoes an extrusion coating onto the base material layer, a dry lamination method in which a film or sheet of the resin layer are laminated onto the base material layer with an adhesive or the like placed therebetween, a direct lamination method in which at least a surface of the base material layer and the film or sheet resin layer is melted to laminate the two layers together, a so-called sandwich lamination in which the base material layer and the film or sheet resin layer are laminated with an intermediate layer constituting a bonding layer extruded therebetween, and a coextrusion-lamination method in which a synthetic resin that forms the base material and a resinous kneaded compound that forms the resin layer are extruded from a flat die or circular die provided in an extruder and laminated.

Further, the method of laminating the innermost layer comprised of the hydrophilic and water insoluble thermoplastic resin and the adjacent layer comprised of the above-described resin layer may be similar to the method of laminating the base material layer and the resin layer. Moreover, the same lamination method is carried out on the innermost layer comprised of the resin layer having the above-described water vapor transmission rate and the adjacent layer comprised of the above-described resin layer.

In the laminate of the present invention, as described above, the base layer may be made from the base material layer and the above-described resin layer together with the hydrophilic and water insoluble thermoplastic resin or the resin having the above-described water vapor transmission rate. A layer or layers made of the same material or a different material (e.g., a gas-barrier resin layer, an inorganic compound vapor deposited resin film, etc.) may be provided between the base material layer and the above-described resin or on the outside of the base material layer to construct a multilayered laminate.

A container for storing liquid foods formed from the composition (which includes packaging materials, formed material, etc. made therefrom) and the laminate having the above-described construction exhibit an oxygen absorbing function when the water content of the liquid foods filled and sealed inside the container acts on the composition, innermost layer or the layer adjacent to the innermost layer.

Namely, before filling the contents, the A component is protected by the B component that has an oxygen gas barrier characteristics and is prevented from being consumed by the surrounding oxygen, so that it maintains its oxygen absorbing capability. However, when the contents are filled, the water component gradually reaches through the C component the B component dispersed in the C component, which causes the B component to lose its oxygen barrier characteristics, whereby the A component included therein exhibits an oxygen absorbing function. In particular, when the D component is used together with the A component, the oxygen absorbing function of the A component is improved. Further, when a layer of the resin having the water vapor transmission rate described above is used as the innermost layer, it will improve the sealing characteristics for the contents and reduce the risk of the A component undergoing elusion while maintaining an oxygen absorbing function of the adjacent resin layer.

The present invention further includes a laminate in which the innermost layer is a resin layer manufactured by dispersing a porous inorganic compound supporting ascorbic acids into a hydrophobic thermoplastic resin, and a laminate in which an innermost layer is a resin layer having a water vapor transmission rate of not less than 5 g/m$^2$·24 hours at 40° C. and 90% RH and a layer adjacent to the inner most layer is a resin layer manufactured by dispersing a porous inorganic compound supporting ascorbic acids into a hydrophobic thermoplastic resin.

The ascorbic acids includes ascorbic acid, araboascorbic acid, the salts thereof (sodium salts, potassium salts, etc.), acyl derivatives (stearoyl and palmitoyl derivatives) and the like.

The porous inorganic compounds can be selected from any of the compounds in the D component, but synthetic zeolite is particularly preferred.

The hydrophobic thermoplastic resin can be selected from any of the compounds from the C component, from which polyolefin resin is preferred, with polyethylene based resin and polypropylene based resin being particularly preferred.

With regards to the method of making the porous inorganic compound supporting the ascorbic acids, it is possible to employ a method in which both compounds are brought into contact inside an appropriate medium. In this connection, appropriate mediums include alcohols, ethers, ketones, hydrocarbons, halohydrocarbons and the like.

In the preferred method for producing the porous inorganic compound supporting ascorbic acids, the porous inorganic compound is either immersed into a lower alcohol solution, such as an ethanol solution of ascorbic acids, or the solution is passed through a column filled with the porous inorganic compound to cause the solution to be absorbed by the porous inorganic compound. Such methods may also be carried out under heated conditions.

The amount of the ascorbic acids and porous inorganic compound is used in the ratio that the weight of the porous inorganic compound is 1~50 times larger than that of the ascorbic acids, and in particular in the ratio that the former is 1.2~10 times larger than that of the latter.

In the method of dispersing the porous inorganic compound that supports ascorbic acids as described above (that compound is hereinafter referred to a supporting porous inorganic compound) into the hydrophobic thermoplastic resin, it is preferred that both compounds are kneaded at a temperature not lower than the melting temperature of the thermoplastic resin by means of an appropriate kneading machine, preferably an extruder.

Although it is not possible to establish an absolute usage ratio of the supporting porous inorganic compound and thermoplastic resin because it depends on the type of liquid foods, the storage period and the environmental conditions existing inside and outside the storage container, during the kneading of both compounds, the supporting porous inorganic compound should normally be present in the range of 2~50% by weight, and preferably in the range of 5~30% by weight.

Because these kneading proportions are used for the resin layer which will form either the innermost layer of the laminate of the present invention or the layer adjacent to the innermost layer, it is possible to prepare in advance a master batch in which the supporting porous inorganic compound has a ratio that exceeds the above-described ratio, and dilute an appropriate portion thereof with the thermoplastic resin so as to realize the above-described ratio, when forming the laminate.

The laminate of the present invention can be constructed by forming the innermost layer from a resin layer made of the above-described kneaded compounds. Further, the laminate of the present invention can be constructed from an innermost layer of resin having a water vapor transmission rate of not less than 5 g/m$^2$·24 hours at 40° C. and 90% RH with an adjacent layer made from the above-described resin. In this connection, there are no limitations to the thickness of such laminated bodies, but the thickness may lie within the range 10~600 μm which is the normal thickness of a packaging material for packaging liquid foods. Of course, it is possible to make the laminate thinner or thicker than this range.

Further, the resin for resin layer having the above-described water vapor transmission rate for use in forming the innermost layer may be selected from resin for the resin layer having the water vapor transmission rate previously described above, but of those resins polyolefin resin is preferred, with polyethylene based resin and polypropylene based resin are particularly preferred.

In this connection, the same lamination method as described previously is used for the base material layer of the laminate and the above-described resin layer. Further, in the laminate of the present invention, the base layer may be made from the base material layer and the above-described resin layer together with the resin layer having the water vapor transmission rate described above. It is possible to provide a layer or layers made of the same material or a different material between the base material layer and the above-described resin and on the outside of the base material layer to construct a multilayered laminate.

Further, when the water component of the filled and sealed liquid foods contents acts on the above-described resin layer, the container for storing liquid foods formed from the laminate of the present invention having the structure described above exhibits an oxygen absorbing function.

Namely, because the ascorbic acids in the resin layer is stable in the presence of oxygen under dry conditions at normal temperatures, it is possible to preserve the above-described function during storage of the packaging material. However, when filled with contents, the water content passes through the thermoplastic resin and gradually reaches the supporting porous inorganic compound, whereby the ascorbic acid exhibits an oxygen absorbing function.

Further, when the innermost layer is made of a resin layer having a water vapor transmission rate of not less than 5 g/m$^2$·24 hours at 40° C. and 90% RH, the oxygen absorbing function of the adjacent resin layer is preserved, and at the same time this improves the contents sealing characteristics and reduces the risk of elusion of the ascorbic acids in the resin layer.

EMBODIMENTS

Next, the present invention will be described by using embodiments.

(Embodiment 1)

Five parts by weight of ascorbic acid and 95 parts by weight of ethylene-vinyl alcohol copolymer (containing ethylene at 47 molar %, with a melting temperature of 160° C.) was supplied to a dual extruder and kneaded, with both substances then being outputted from the die of the extruder in the form of pellet.

Next, 10 parts by weight of the above-described pellet and 90 parts by weight of low-density polyethylene (with a density of 0.919 g/cm$^3$) were kneaded in the same manner as described above to obtain a pellet of the composition of the present invention having an ascorbic acid content of 0.5% by weight.

Then 50 g of this pellet and 10 ml of distilled water were placed in a 180 ml-volume, oxygen-impermeable, cup-shaped container which was then sealed by heat sealing with an oxygen-impermeable film.

Next, this container was placed in a constant temperature bath at 15° C. and the concentration of oxygen was measured with an oxygen microanalyzer directly after the heat sealing, after one week and then after two weeks to determine the reduction in the oxygen content, thereby giving the amounts of oxygen absorbed. These absorbed amounts of oxygen are shown in Table 1.

(Embodiment 2)

Except for using 20 parts by weight of a kneaded compound comprised of ascorbic acid and ethylene-vinyl alcohol copolymer and 80 parts by weight of low-density polyethylene, the process carried out in this example embodiment was the same as that of Embodiment 1, whereby a pellet of the composition having an ascorbic acid content of 1% by weight was obtained.

Using this pellet, the same oxygen absorbing analysis described in Embodiment 1 was carried out, and the results thereof are shown in Table 1.

(Embodiment 3)

Except for using a pellet made of 10 parts by weight of ascorbic acid and 90 parts by weight of ethylene-vinyl alcohol copolymer, the process carried out in this example embodiment was the same as that of Embodiment 2, whereby a pellet of the composition of the present invention having an ascorbic acid content of 2% by weight was obtained.

Using this pellet, the same oxygen absorbing analysis described in Embodiment 1 was carried out, and the results thereof are shown in Table 1.

(Embodiment 4)

Except for using a compound comprised of 2.5 parts by weight of ascorbic acid and 2.5 parts by weight of A type zeolite in place of the 5 parts by weight of ascorbic acid, the process carried out in this example embodiment was the same as that of Embodiment 1, whereby a pellet of the composition having an ascorbic acid content of 2.5% by weight and an A type zeolite content of 2.5% by weight was obtained.

Using this pellet, the same oxygen absorbing analysis described in Embodiment 1 was carried out, and the results thereof are shown in Table 1.

(Comparative Example 1)

Except for not using ascorbic acid, the process carried out in this comparative example was the same as that of Embodiment 1, and using the thus-obtained pellet, the same oxygen absorbing analysis described in Embodiment 1 was carried out, with the results thereof being shown in Table 1.

(Reference Examples 1~4)

Except for not using distilled water, the pellets comprised of the compositions of the present invention obtained in Embodiments 1~4 were subjected to the same sealing, storage and oxygen absorbing analysis as that carried out in Embodiment 1, with the results thereof being shown in Table 1. In this regard, Reference Example 1 corresponds to Embodiment 1, Reference Example 2 corresponds to Embodiment 2, Reference Example 3 corresponds to Embodiment 3, and Reference Example 4 corresponds to Embodiment 4.

TABLE 1

| | AMOUNTS OF OXYGEN ABSORBED (ml) | | |
|---|---|---|---|
| | Directly after heat sealing | After one week | After two weeks |
| Embodiment 1 | 0.0 | 0.7 | 1.3 |
| Embodiment 2 | 0.0 | 1.1 | 2.0 |
| Embodiment 3 | 0.0 | 2.8 | 5.2 |
| Embodiment 4 | 0.0 | 0.5 | 1.1 |
| Comparative Example 1 | 0.0 | 0.0 | 0.0 |
| Reference Example 1 | 0.0 | 0.0 | 0.0 |
| Reference Example 2 | 0.0 | 0.0 | 0.0 |
| Reference Example 3 | 0.0 | 0.0 | 0.1 |
| Reference Example 4 | 0.0 | 0.0 | 0.0 |

(Embodiment 5)

A mixture comprised of 10 parts by weight of the pellet made of ascorbic acid and ethylene-vinyl alcohol copolymer obtained in same manner as described in Embodiment 1, 10 parts by weight of maleic acid anhydride modified linear low-density polyethylene (having a density of 0.91 g/cm$^3$) and 80 parts by weight of low-density polyethylene (having density of 0.921 g/cm$^3$) (LDPE) and such LDPE were respectively supplied to an extruder where they underwent a coextrusion by means of a circular die provided in the extruder to form a two-layer inflation film comprised of a 30 $\mu$m resin layer having an ascorbic acid content of 0.5% by weight and a 10 $\mu$m LDPE layer.

Next, the two-layer inflation film and a base material comprised of LDPE (15 μm)-paperboard (having basis weight of 200 g/m²)-LDPE (15 μm)-aluminum foil (7 μm) underwent sandwich lamination at 300° C. using a bonding layer of LDPE (having a density of 0.919 g/cm³) (20 μm) to form a laminate having the structure described below in accordance with the present invention.

LDPE-paperboard-LDPE-aluminum foil//LDPE//LDPE-ascorbic acid containing resin layer.

By using this laminate, a brick-shaped paper container was obtained; the container was filled with 200 ml of deaerated water having a dissolved oxygen concentration of 0.6 mg/l by a paper container filling machine so that the ascorbic acid containing resin layer was used for the inside surface of the container.

This container filled with deaerated water was then placed into a constant temperature bath at 37° C. and kept there for a prescribed period of time, during which the concentration of dissolved oxygen in the deaerated water was measured. The results of such measurements are shown in Table 2.

(Embodiment 6)

Except for using the pellet obtained in Embodiment 4 in place of the pellet made of ascorbic acid and ethylene-vinyl alcohol copolymer used in Embodiment 5, the laminate constructed in this example embodiment is the same as that of Embodiment 5 and thus underwent the same evaluation as was carried out for Embodiment 5. The results of which are shown in Table 2.

(Embodiment 7)

In the same manner as was described for Embodiment 5, a three-layer inflation film having the structure described below was formed.

LDPE (10 μm)-ascorbic acid containing resin layer (30 μm)-LDPE (10 μm).

Except for using this three-layer inflation film in place of the two-layer inflation film described above, the laminate constructed in this example embodiment is the same as that of Embodiment 5 and thus underwent the same evaluation as was carried out for Embodiment 5. The results of which are shown in Table 2.

(Embodiment 8)

A three-layer inflation film in which one of the side LDPE layers had a 30 μm-thickness was formed in the same manner as described above for Embodiment 7. Except for using the 30 μm-thick LDPE layer of this three-layer inflation film for the inside of the container, the laminate is constructed in the same manner as described above for Embodiment 5 and thus underwent the same evaluation as was carried out for Embodiment 5. The results of which are shown in Table 2.

(Embodiment 9)

A three-layer inflation film, in which one of the side layers had a 20 μm-thickness and was comprised of a mixture containing 90 parts by weight of polypropylene (having a density of 0.90 g/cm³) and 10 parts by weight of ethylene-1-butene copolymer (having a density of 0.88 g/cm³), was formed in the same manner as described above for Embodiment 7. Except for using the 20 μm-thick mixed resin compound layer of this three-layer inflation film for the inside of the container, the laminate is constructed in the same manner as described above for Embodiment 5 and thus underwent the same evaluation as was carried out for Embodiment 5. The results of which are shown in Table 2.

(Embodiment 10)

A mixture comprised of 10 parts by weight of the pellet made of ascorbic acid and ethylene-vinyl alcohol copolymer obtained in same manner as described in Embodiment 1 and 90 parts by weight of maleic acid anhydride modified linear low-density polyethylene (having a density of 0.91 g/cm³), and the ethylene-vinyl alcohol copolymer (EVOH) used in Embodiment 1, and the LDPE used in Embodiment 5 were respectively supplied to an extruder, in the same manner as described above in Embodiment 5, where they underwent a coextrusion by means of a circular die provided in the extruder to form a three-layer inflation film having the structure indicated below.

LDPE (10 μm)-ascorbic acid containing resin layer (15 μm)-EVOH (15 μm).

Except for using the EVOH layer of this three-layer inflation film for the inside of the container, the laminate is constructed in the same manner as described above for Embodiment 5 and thus underwent the same evaluation as was carried out for Embodiment 5. The results of which are shown in Table 2.

(Comparative Example 2)

A three-layer inflation film in which one of the side LDPE layers had a 40 μm-thickness was formed in the same manner as described above for Embodiment 7. Except for using the 40 μm-thick LDPE layer of this three-layer inflation film for the inside of the container, the laminate is constructed in the same manner as described above for Embodiment 5 and thus underwent the same evaluation as was carried out for Embodiment 5. The results of which are shown in Table 2.

(Comparative Example 3)

Except for using only ethylene-vinyl alcohol copolymer in place of the pellet made of ascorbic acid and ethylene-vinyl alcohol copolymer, the laminate is constructed in the same manner as described above for Embodiment 5 and thus underwent the same evaluation as was carried out for Embodiment 5. The results of which are shown in Table 2.

TABLE 2

| | CONCENTRATION OF DISSOLVED OXYGEN (mg/l) | | | |
|---|---|---|---|---|
| Storage Period | Directly after filling | 7 days | 14 days | 28 days |
| Embodiment 5 | 0.6 | 0.6 | 0.6 | 0.7 |
| Embodiment 6 | 0.6 | 0.6 | 0.6 | 0.5 |
| Embodiment 7 | 0.6 | 0.6 | 0.6 | 0.7 |
| Embodiment 8 | 0.6 | 1.0 | 1.2 | 1.3 |
| Embodiment 9 | 0.6 | 0.7 | 0.8 | 0.8 |
| Embodiment 10 | 0.6 | 0.7 | 0.9 | 1.1 |
| Comparative Example 2 | 0.6 | 1.1 | 1.5 | 2.3 |
| Comparative Example 3 | 0.6 | 1.2 | 1.6 | 2.5 |

(Embodiment 11)

A solution of warm ethanol 7.21 having 300 g of ascorbic acid dissolved therein was slowly passed through a glass column filled with 500 g of A type zeolite to cause the zeolite to support the ascorbic acid. Then after washing this supporting zeolite with chilled ethanol, drying was carried out at reduced pressure to manufacture ascorbic acid supporting zeolite.

Next, 30 parts by weight of this thus-obtained ascorbic acid supporting zeolite and 70 parts by weight of low-density polyethylene (having a density of 0.919 g/cm³) (LDPE) were supplied to a dual extruder and kneaded to obtain a master batch in which the content of the ascorbic acid supporting zeolite is 30% by weight. Then, to lower the ascorbic acid supporting zeolite content to 10% by weight, this master batch and the LDPE used as described above were supplied, together with ethylene-acrylic acid copolymer (having a density of 0.94 g/cm$^3$) (EAA), respectively to an extruder to undergo coextrusion from the circular die provided in the extruder to form a two-layer inflation film comprised of a 30 μm supporting zeolite containing LDPE layer and 10 μm EAA layer.

Next, this two-layer inflation film and a base material comprised of LDPE (15 μm)-paperboard (having basis weight of 200 g/m$^2$)-LDPE (15 μm)-aluminum foil (7 μm) underwent sandwich lamination at 280° C. using a bonding layer of EAA (20 μm) to obtain a laminate of the present invention having the structure indicated below.

LDPE-paperboard-LDPE-aluminum foil//EAA//EAA-supporting zeolite containing LDPE.

Using this laminate, a brick-shaped paper container was obtained; the container was filled with 250 ml of deaerated water having a dissolved oxygen concentration of 0.5 mg/l by a paper container filling machine so that the supporting zeolite containing LDPE layer was used for the inside surface of the container.

This container filled with deaerated water was then placed into a constant temperature bath at 37° C. and kept there for a prescribed period of time, during which the concentration of dissolved oxygen in the deaerated water was measured. The results of such measurements are shown in Table 3.
(Embodiment 12)

Using the same process described above in Embodiment 11, a three-layer inflation film was made to have the structure indicated below.

LDPE (10 μm)-supporting zeolite containing LDPE (30 μm)-LDPE (10 μm).

Except for using this three-layer inflation film in place of the two-layer inflation film, the laminate is constructed in the same manner as described above for Embodiment 11 and thus underwent the same evaluation as was carried out for Embodiment 11. The results of which are shown in Table 3.
(Embodiment 13)

A three-layer inflation film in which one of the side LDPE layers had a 30 μm-thickness was formed in the same manner as described above for Embodiment 12. Further, a laminate was constructed in the same manner as was done for Embodiment 11 so that the 30 μm-thick LDPE layer of this three-layer inflation film was used for the inside of the container and thus underwent the same evaluation as was carried out for Embodiment 11. The results of which are shown in Table 3.
(Embodiment 14)

A three-layer inflation film, in which one of the side layers was a 20 μm-thick resin mixed layer comprised of a mixture containing 90 parts by weight of polypropylene (having a density of 0.90 g/cm$^3$) and 10 parts by weight of ethylene-1-butene copolymer (having a density of 0.88 g/cm$^3$), was formed in the same manner as described above for Embodiment 12.

Further, a laminate was constructed in the same manner as was done for Embodiment 11 so that the 20 μm-thick mixed resin layer of this three-layer inflation film was used for the inside of the container and thus underwent the same evaluation as was carried out for Embodiment 11. The results of which are shown in Table 3.
(Comparative Example 4)

Except for using A type zeolite which does not support ascorbic acid, the laminate was constructed in the same manner as was described for Embodiment 11 and thus underwent the same evaluation as was carried out for Embodiment 11. The results of which are shown in Table 3.
(Comparative Example 5)

Except for not using ascorbic acid containing zeolite, the laminate was constructed in the same manner as was described for Embodiment 11 and thus underwent the same evaluation as was carried out for Embodiment 11. The results of which are the same as those of Comparative Example 4.

TABLE 3

| | CONCENTRATION OF DISSOLVED OXYGEN (mg/l) | | | |
|---|---|---|---|---|
| Storage Period | Directly after filling | 7 days | 14 days | 28 days |
| Embodiment 11 | 0.5 | 1.1 | 1.3 | 1.8 |
| Embodiment 12 | 0.5 | 1.2 | 1.4 | 1.9 |
| Embodiment 13 | 0.5 | 1.3 | 1.6 | 2.3 |
| Embodiment 14 | 0.5 | 1.2 | 1.5 | 2.2 |
| Comparative Example 4 | 0.5 | 1.3 | 2.0 | 3.1 |

INDUSTRIAL APPLICABILITY

Because the composition of the present invention exhibits an oxygen absorbing function in the presence of water, when such composition is used for the innermost layer or the layer adjacent to the innermost layer of the laminate of the present invention, or when a container is formed from the laminate of the present invention which includes a resin layer containing an ascorbic acid derivative, it is possible to absorb not only the oxygen enclosed inside such container, but also oxygen which passes through from the outside of such container, thereby making it possible to reduce the amount of oxygen present. Accordingly, it becomes possible to prevent degradation of the liquid foods due to oxygen during storage, whereby it becomes possible to preserve the quality and extend the shelf life thereof.

Furthermore, it is easy to adjust the oxygen absorbing function by changing the concentration of the reducing organic compound, the kneaded compound mixing proportion of the reducing organic compound and the hydrophilic and water insoluble thermoplastic resin, the concentration of the ascorbic acids supported by the porous inorganic compound, and the amount of supporting porous inorganic compound added. Accordingly, it is simple to carry out adjustments to correspond with the type of foods to be preserved and the internal and external environmental conditions present during storage of such foods.

What is claimed is:

1. A pellet to be used in a multi-layer laminate for storing liquid foods, comprising a hydrophilic reducing organic compound and a hydrophilic and water insoluble thermoplastic resin, wherein the hydrophilic reducing organic compound is included in the hydrophilic and water insoluble thermoplastic resin and the hydrophilic and water insoluble thermoplastic resin provides an oxygen gas barrier for the hydrophilic reducing organic compound and wherein the pellet is prepared by:
   kneading the hydrophilic reducing organic compound and the hydrophilic and water insoluble thermoplastic resin compound at a temperature not higher than the melting temperature or decomposition point of the hydrophilic reducing organic compound and equal to or higher than the melting temperature of the hydrophilic and water insoluble thermoplastic resin to form a kneaded compound;

kneading the kneaded compound comprised of the hydrophilic reducing organic compound and the hydrophilic and water insoluble thermoplastic resin compound with a hydrophobic thermoplastic resin so that the kneaded compound is dispersed in the hydrophobic thermoplastic resin; and forming a pellet from the hydrophobic thermoplastic resin containing the dispersed kneaded compound wherein 50 grams of pellet when stored at 15° C. for one week in a sealed 180 ml container requires the presence of water in order to absorb oxygen.

2. The pellet of claim 1, in which the hydrophilic reducing organic compound is present in the range of 0.05~10% by weight, the hydrophilic and water insoluble thermoplastic resin is present in the range of 3~40% by weight, and the hydrophobic thermoplastic resin is present in the range of 50~96% by weight.

3. The pellet of claim 1, in which the hydrophilic reducing organic compound is a compound selected from the group consisting of ascorbic acids, polyphenols and catechins.

4. The pellet of claim 1, in which the hydrophilic and water insoluble thermoplastic resin is ethylene-vinyl alcohol copolymer, polyvinyl alcohol having a saponification degree of 95% or higher, or polyamide resin.

5. The pellet of claim 1, in which the hydrophobic thermoplastic resin comprises polyolefin resin.

6. A pellet to be used in a multi-layer laminate for storing liquid foods, comprising a hydrophilic reducing organic compound, a porous inorganic compound and a hydrophilic and water insoluble thermoplastic resin, wherein the hydrophilic reducing organic compound is included in the hydrophilic and water insoluble thermoplastic resin and the hydrophilic and water insoluble thermoplastic resin provides an oxygen gas barrier for the hydrophilic reducing organic compound and wherein the pellet is prepared by:

kneading the hydrophilic reducing organic compound, the porous inorganic compound and the hydrophilic and water insoluble thermoplastic resin compound at a temperature not higher than the melting temperature or decomposition point of the hydrophilic reducing organic compound and equal to or higher than the melting temperature of the hydrophilic and water insoluble thermoplastic resin to form a kneaded compound;

kneading the kneaded compound comprised of the hydrophilic reducing organic compound, the porous inorganic compound and the hydrophilic and water insoluble thermoplastic resin compound with the hydrophobic thermoplastic resin so that the kneaded compound is dispersed in a hydrophobic thermoplastic resin; and forming a pellet from the hydrophobic thermoplastic resin containing the dispersed kneaded compound wherein 50 grams of pellet when stored at 15° C. for one week in a sealed 180 ml container requires the presence of water in order to absorb oxygen.

7. The pellet of claim 6, in which the hydrophilic reducing organic compound is present in the range of 0.05~10% by weight, the porous inorganic compound is present in the range of 0.05~10% by weight, the hydrophilic and water insoluble thermoplastic resin is present in the range of 3~40% by weight, and the hydrophobic thermoplastic resin is present in the range of 40~96% by weight.

8. The pellet of claim 6, in which the porous inorganic compound comprises synthetic zeolite.

* * * * *